(12) United States Patent
Siram et al.

(10) Patent No.: US 11,321,525 B2
(45) Date of Patent: May 3, 2022

(54) GENERATION OF MARKUP-LANGUAGE SCRIPT REPRESENTING IDENTITY MANAGEMENT RULE FROM NATURAL LANGUAGE-BASED RULE SCRIPT DEFINING IDENTITY MANAGEMENT RULE

(71) Applicant: NETIQ CORPORATION, Houston, TX (US)

(72) Inventors: Sriram Priyatham Siram, Bangalore (IN); Prashanth Sutrave, Bangalore (IN); Amit Suresh Prabhu, Bangalore (IN); Apoorv Rastogi, Bangalore (IN); Akshatha Kadri, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/931,799

(22) Filed: Jul. 17, 2020

(65) Prior Publication Data
US 2021/0056262 A1    Feb. 25, 2021

(51) Int. Cl.
G06F 17/00 (2019.01)
G06F 40/221 (2020.01)
G06F 40/284 (2020.01)
G06F 40/154 (2020.01)

(52) U.S. Cl.
CPC .......... *G06F 40/221* (2020.01); *G06F 40/154* (2020.01); *G06F 40/284* (2020.01)

(58) Field of Classification Search
None
See application file for complete search history.

(56) References Cited

U.S. PATENT DOCUMENTS

| 7,127,641 B1 | 10/2006 | Anderson |
| 7,769,736 B2 | 8/2010 | Vella |
| 8,769,346 B2 | 7/2014 | Sijelmassi |
| 8,789,140 B2 | 7/2014 | Williams et al. |
| 9,098,558 B2 | 8/2015 | Arshad et al. |
| 9,535,904 B2 | 1/2017 | Prokofyev et al. |
| 10,127,201 B2 | 11/2018 | Dettman et al. |

(Continued)

FOREIGN PATENT DOCUMENTS

| CN | 102622215 A | 8/2012 |
| CN | 103577174 A | 2/2014 |

OTHER PUBLICATIONS

Author UnKnown; Novell—NsureTM Identity Manager; Administration Guide; May 4, 2005; 292 pages.

(Continued)

*Primary Examiner* — Mustafa A Amin

(57) ABSTRACT

A natural language (NL)-based rule script defines an identity management (IM) rule that governs how a driver performs data transformation among sub-systems of an IM system to coordinate user identity and data access across the sub-systems. An intermediate object tree (IOT) for the IM rule defined within the NL-based rule script is generated by parsing conditions and actions of the IM rule specified in the NL-based rule script. A markup-language (ML) script is generated from the IOT of the IM rule. The driver uses the ML script when performing the data transformation among the sub-systems of the IM system to coordinate user identity and data access across the sub-systems.

20 Claims, 7 Drawing Sheets

(56) References Cited

U.S. PATENT DOCUMENTS

| | | | |
|---|---|---|---|
| 2005/0251853 A1* | 11/2005 | Bhargavan | H04L 63/12 726/1 |
| 2007/0009161 A1 | 1/2007 | Hollingsworth | |
| 2009/0012951 A1* | 1/2009 | Vella | G06F 16/8373 |
| 2009/0070327 A1 | 3/2009 | Loeser et al. | |
| 2019/0102438 A1 | 4/2019 | Murray | |
| 2019/0179732 A1* | 6/2019 | Venkatasubramanian | G06F 8/10 |
| 2019/0213254 A1* | 7/2019 | Ray | G06N 20/00 |

OTHER PUBLICATIONS

Author Unknown; Pass Consulting Group; XML Interface For Quick & Easy Content Aggregate & Integartion of Multi GDS Into Your Travel System; Travel XML API; Oct. 18, 2019; 13 pages.

J. Keeney, et al.; Chisel: A policy driven, Context aware dynamic adaption framework; IEEE Conference Publication; Oct. 18, 2019; 2 pages.

NETIQ; identity Manager, Understanding Policies; https://www.netiq.com/documentation/identity-manager-47/policy_understanding/data/what-are-identity-manager-policies.html; Feb. 2018; 70 pages.

Xiao, et al.; Automated Extraction of Security Policies from Natural-Language Software Documents; Dept. of Computer Science, NC University; 2012; 11 pages.

\* cited by examiner

GENERATION OF MARKUP-LANGUAGE SCRIPT REPRESENTING IDENTITY MANAGEMENT RULE FROM NATURAL LANGUAGE-BASED RULE SCRIPT DEFINING IDENTITY MANAGEMENT RULE

BACKGROUND

In large-scale computing environments, such as enterprise computing environments, different systems store different types of data that a user may have to access to perform his or her role in an organization. Even if at a high level a user has just one username and password or other authentication mechanism, such as a digital certificate, within an a computing environment, individual systems may still maintain separate credentials for the user. Identity management (IM) ensures that user identity data is synchronized across these disparate systems, among other things.

DETAILED DESCRIPTION

Figure 1:
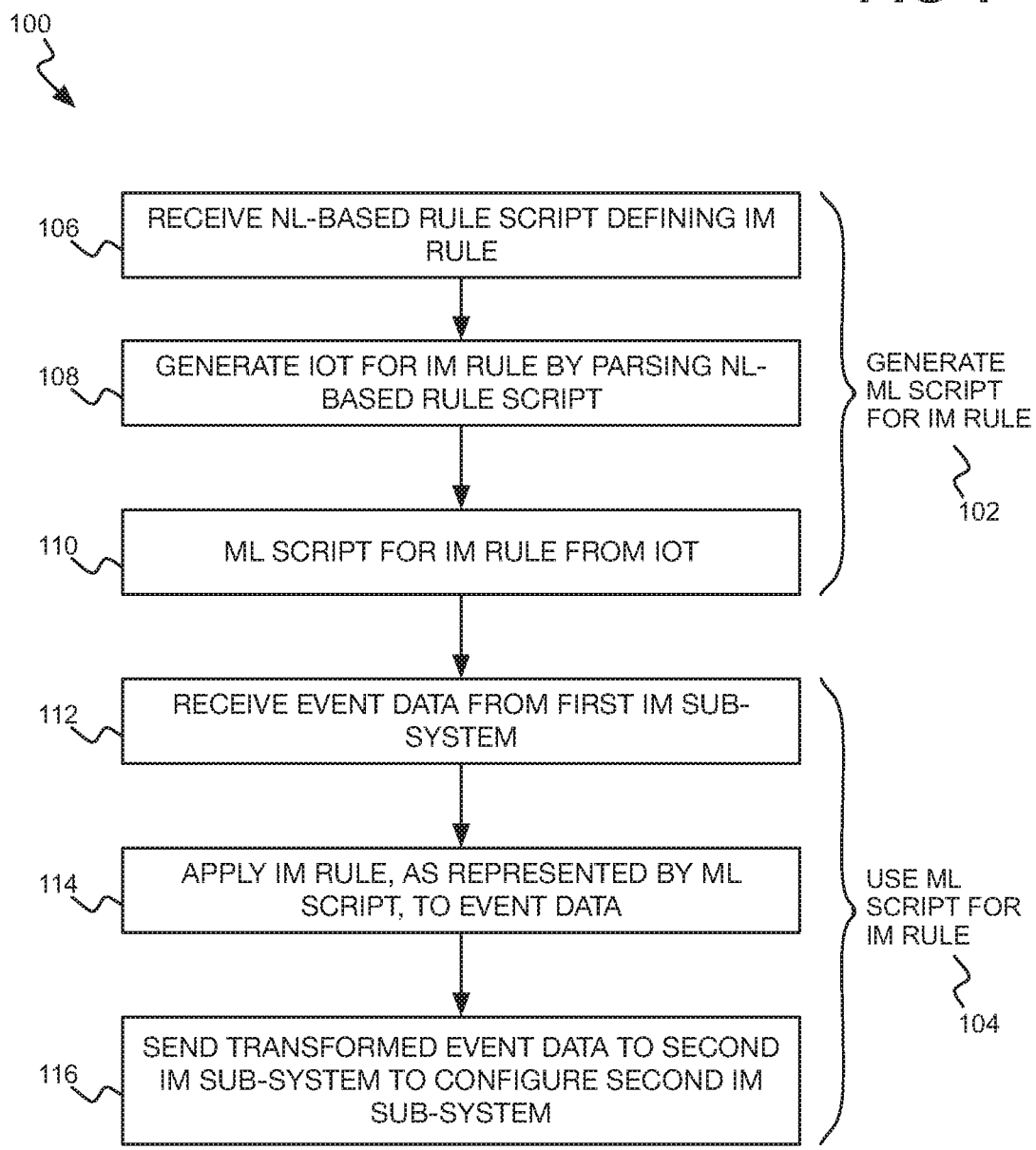
FIG. 1 is a flowchart of an example method for generating and subsequently using a markup-language (ML) script for an identity management (IM) rule to coordinate user identity and data access across IM sub-systems.

As noted in the background, identity management (IM) provides for user identity synchronization. An IM system may be considered as including different sub-systems that store similar types of data. IM synchronizes identity data across such connected sub-systems, and can ensure that users access just the data and other resources required for their jobs. IM may be able to provision and deprovision user access across the sub-systems of an IM system, based on user roles within their organizations. An example of IM software includes NetIQ Identity Manager and NetIQ Access Manager, available from Micro Focus International plc, of Newbury, U.K.

IM software synchronizes data across the different sub-systems according to policies, which are made up of one or more rules. A policy rule can govern how updated data received from one sub-system is transformed prior to transmission to another sub-system so that user identity data across the sub-systems remains synchronized. Specifically, a driver may be specific to at least a first sub-system that sends updated user identity data and a second sub-system that receives correspondingly transformed user identity data. The driver applies one or more policies to updated data received from the former sub-system and sends the resultantly transformed data to the latter sub-system.

A policy of one or more rules that an IM driver applies may be implemented in script form, using a markup language (ML) like an extensible markup language (XML). For example, policies used by drivers in the context of the NetIQ Identity Manager and the NetIQ Access Manager software are implemented in an ML script known as DirXML Script. DirXML Script is a domain-specific language by which policy rules for transforming data can be specified. Another example of such a language in which ML scripts can be implemented is the extensible stylesheet transformation language (XSLT).

ML scripts defining IM policies may be developed directly in an ML, although doing so is relatively uncommon because the process is tedious and prone to error. More common is the usage of an integrated development environment (IDE) that provides a graphical user interface (GUI). However, for robust scripting languages, usage of an IDE can still be unintuitive and tedious, requiring a large number of GUI element clicks to formulate even the most basic formulations of rule logic.

Techniques described herein lessen these issues surrounding development of ML script-implemented policies. An IM rule of a policy is defined by a natural language (NL)-based rule script, or another type of rule script. The IM rule governs how an IM driver performs data transformations among the sub-systems of an IM system to coordinate (e.g., synchronize) user identity and data access across the sub-systems. The NL-based rule script can have minimal syntactical constraints, permitting IM rules to be more intuitively defined in less time. The ML script that a driver of the IM subsystem uses to coordinate user identity and data access across the sub-systems is then generated from the NL-based rule script.

FIG. 1 shows an example method 100. The method 100 includes generation of an ML script for an IM rule (102), and then usage of the generated ML script for the IM rule (104). ML script generation may be performed at a different computing device or system than subsequent usage of the ML script. Parts of the method 100 can be implemented via a non-transitory computer-readable data storage medium storing program code that such a computing device or computing devices execute.

Generation of an ML script includes receiving an NL-based rule script that defines an IM rule (106). As noted above, the IM rule governs how a driver performs data transformation among sub-systems of an IM system to coordinate user identity and data access across the sub-systems. The rule script can be NL-based in that it permits construction of an IM rule using a syntax that is similar to human NL, as opposed to a computer-oriented programming language, or that is at least more similar to human NL than the resultantly generated ML script for the IM rule. In another implementation, the rule script may not be NL-based, but rather more syntactically strict (i.e., have stronger or even absolute syntactical constraints).

An IM rule specifies conditions and actions. The IM rule's conditions have to be satisfied for the IM rule's actions to be performed. Actions in turn may contain nested conditions and actions. In one implementation, an NL-based rule script may employ indentation and represent hierarchy, which is one way by which the rule script is more akin to written human NL as compared to a programming language.

Conditions within an NL-based rule script may start with a single "if" keyword. Conditions of a rule may start at the beginning of a line in the rule script, and nested conditions may follow the indentation of corresponding actions. If there are multiple conditions, the conditions are grouped according to conjunctive normal form (CNF) or disjunctive normal form (DNF). A DNF is a canonical normal form including the disjunction of conjunctive clauses—i.e., a logical OR of multiple logical ANDs. A CNF is a canonical normal form including the conjunction of disjunctive clauses—i.e., a logical AND of multiple logical ORs.

Each condition of the NL-based rule script for an IM rule has a left-hand side (LHS) and a right-hand side (RHS). The LHS starts with a keyword, with any parameters to the keyword provided as keyword-value pairs. The RHS is a value or left empty. An operator separates the LHS and the RHS of each condition.

An example of conditions of the NL-based rule script for an IM rule is

If class name is available and class name equals User and operation equals to modify and operation attribute name=EmailAddress is available or If class name is available and class name equals group and operation equals to add In this example, there are two condition groups. The first condition group is "If class name is available and class name equals User and operation equals to modify and operation attribute name=EmailAddress is available". The second condition group is "If class name is available and class name equals group and operation equals to add."

The first condition group has four conditions. In the first condition, "class name is available," the LHS is the keyword "class name" with no parameters, the RHS is the value "available," and the operator is "is." In the second condition, "class name equals User," the LHS is again the keyword "class name" with no parameters, the RHS is the value "User," and the operator is "equals." In the third condition, "operation equals to modify," the LHS is the keyword "operation" with no parameters, the RHS is the value "modify," and the operator is again "equals to." In the fourth condition, the "operation attribute=EmailAddress is available," the LHS is the keyword "operation-attribute name" with the parameter "=EmailAddress," the RHS is the value "available" and the operator is "is."

The second condition group has three conditions. In the first condition, "class name is available," the LHS is the keyword "class name" with no parameters, the RHS is the value "available," and the operator is "is." In the second condition, the LHS is the keyword "class name" with no parameters, the RHS is the value "group," and the operator is "equals." In the third condition, the LHS is the keyword "operation," the RHS is the value "add," and the operator is "equals to." In this example NL-based rule script, then, the conditions are expressed in DNF, as a logical OR of the first condition group's logical ANDs and the second condition group's logical ANDs.

An action within an NL-based rule script may begin with one more indentation than the conditions that govern application of the action. An action is defined as an action string specifying the action as well as arguments to the action. An example of an action of the NL-based rule script for an IM rule is find matching object whose DN is John and department is IAM In this example, the action is "find matching object". The action has two arguments: "DN is John" and "department is IAM". The action is said to have an action string, which is the complete text "find matching object whose DN is John and department is IAM" of the action.

An NL-based rule script may include comments, which can be specified by the hash tag "#". Local variables may be specified within the rule script by the dollar sign "$". Function calls may be prefixed with the string "es:". The rule script may be case insensitive.

Generation of the ML script includes generating an intermediate object tree (IOT) for the IM rule defined within the received NL-based rule script (108), by parsing the conditions and actions of the IM rule as specified in the rule script. The IOT has nodes that are organized to conform with the hierarchy of the ML script that will be generated. The IOT is an intermediate tree in that it is an intermediate data structure between the rule script and the resultantly generated ML script. The IOT is an object tree in that the nodes can correspond to objects of classes of the schema of the ML script. During parsing, the method 100 can in part 108 verify that the rule script does not violate any syntactical rules, that the indentation of conditions and actions is correct within the rule script, and that each condition has a parent condition, with the method 100 raising an error if any such verification fails.

Figure 2:
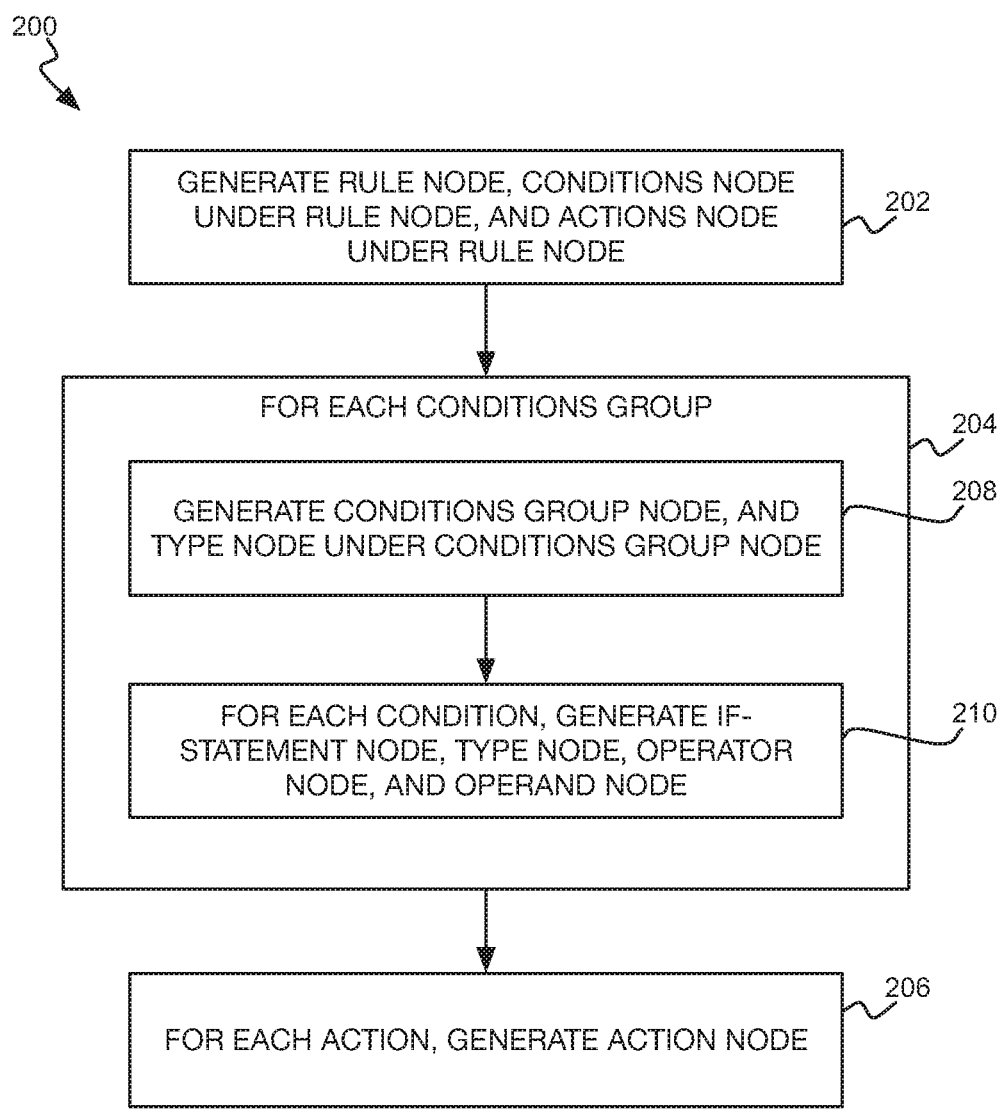
FIG. 2 is a flowchart of an example method for generating an intermediate object tree (IOT) from a natural language (NL)-based rule script for an IM rule.

FIG. 2 shows an example method 200 for generating the IOT from an NL-based rule script. The method 200 can be performed to implement part 108 of the method 100. The method 200 includes generating a rule node, and both a conditions node and an actions node under the rule node (202). The rule node corresponds to a high-level object "rule" for the IM rule to which the NL-based rule script corresponds. Similarly, the conditions node corresponds to a high-level object "conditions" for the conditions of this rule, and the actions node corresponds to high-level object "actions" for the actions of this rule.

Figure 3:
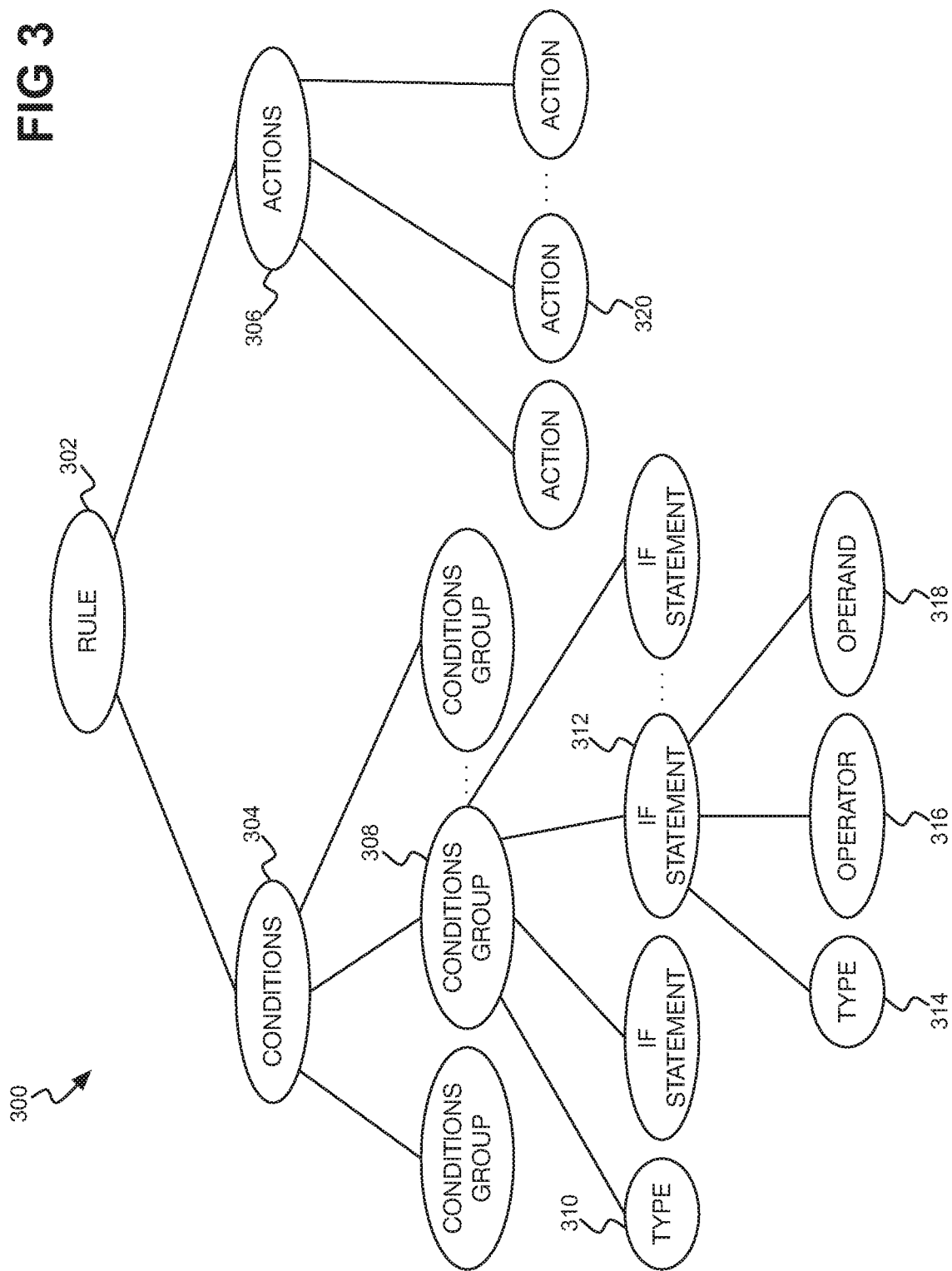
FIG. 3 is a diagram of an example IOT.

FIG. 3 shows an example IOT 300 that the method 200 may generate from an NL-based rule script for an IM rule. In part 202, the method 200 generates the rule node 302. The method 200 also generates the conditions node 304 and the actions node 306 under the rule node 302 in part 202.

Referring back to FIG. 2, the method 200 includes, for each conditions group specified in the NL-based rule script, generating a conditions group node and a type node under this conditions group node (208). The number of conditions group nodes is thus equal to the number of conditions groups in the rule script. The type node for the condition group node of a conditions group specifies whether the conditions of the conditions group are conjunctively related by logical ANDs, or are disjunctively related by logical ORs. In the example IOT 300 of FIG. 3, the method 200 generates in part 208 condition group nodes 308, one of which is shown in detail. The method 200 thus generates a type node 310 under each conditions group node 308 in part 208.

The method 200 includes, for each condition of each conditions group specified in the NL-based rule script, generating an if-statement node under the conditions group node for the conditions group, and type, operator, and operand nodes under the if-statement node (210). The if-statement nodes are examples of condition nodes. There may be conditions that are specified in manners other than by if statements.

The number of if-statement (or other condition) nodes under a conditions group node is thus equal to the number of conditions of the conditions group to which the conditions group node corresponds. The type node under an if-statement (or other condition) node specifies the LHS of a corresponding condition; the operator node specifies the operator of the condition; and the operand node specifies the RHS of the condition. There may be other nodes under the if-statement (or other condition) node as well, such as a miscellaneous node that specifies further information needed to generate the ML script for the LHS of a condition from the IOT.

In the example IOT 300 of FIG. 3, the method 200 generates in part 210 if-statement nodes 312 under each condition group nodes 308, where just the if-statement nodes 312 of one condition group node 308 are shown in detail. One if-statement node 312 is shown in detail in FIG. 3. The method 200 thus generates a type node 314, an operator node 316, and an operand node 318 under each if-statement node 312 in part 210.

The method 200 includes, for each action specified in the NL-based rule script, generating an action node under the actions node (206). The action node for an action of the rule script specifies an action string for the action. The method 200 may simply copy the action string from the rule script into the action node. For each action of the rule script, the action node may be the only node within the IOT. The action node can be a do-if action node if the action is a do-if action, which is an action having nested conditions.

The actions of an IM rule specified in an NL-based rule script are thus treated differently and more simply than the conditions of the rule during parsing of the rule script to generate the IOT. Whereas conditions share the same basic structure, in which each rule has a LHS, a RHS, and an operator, actions do not necessarily share the same basic structure. This is why just one action node is generated for each action. The actions are, in other words, minimally parsed, to just separate the actions into separate action nodes within the IOT, with the specification of each action in the rule script (i.e., the action string of each action) copied into a separate action node. In the example IOT 300 of FIG. 3, the method 200 thus generates in part 206 action nodes 320 corresponding to the actions specified in the rule script.

Referring back to FIG. 1, generation of the ML script for the IM rule specifically includes generating the ML script from the IOT that has been generated (110). The ML script for the rule is not directly generated from the received NL-based rule script for the rule. Rather, the ML script is indirectly generated from the rule script, with the IOT being directly generated from the rule script, and the ML script being directly generated from the IOT.

Figure 4:
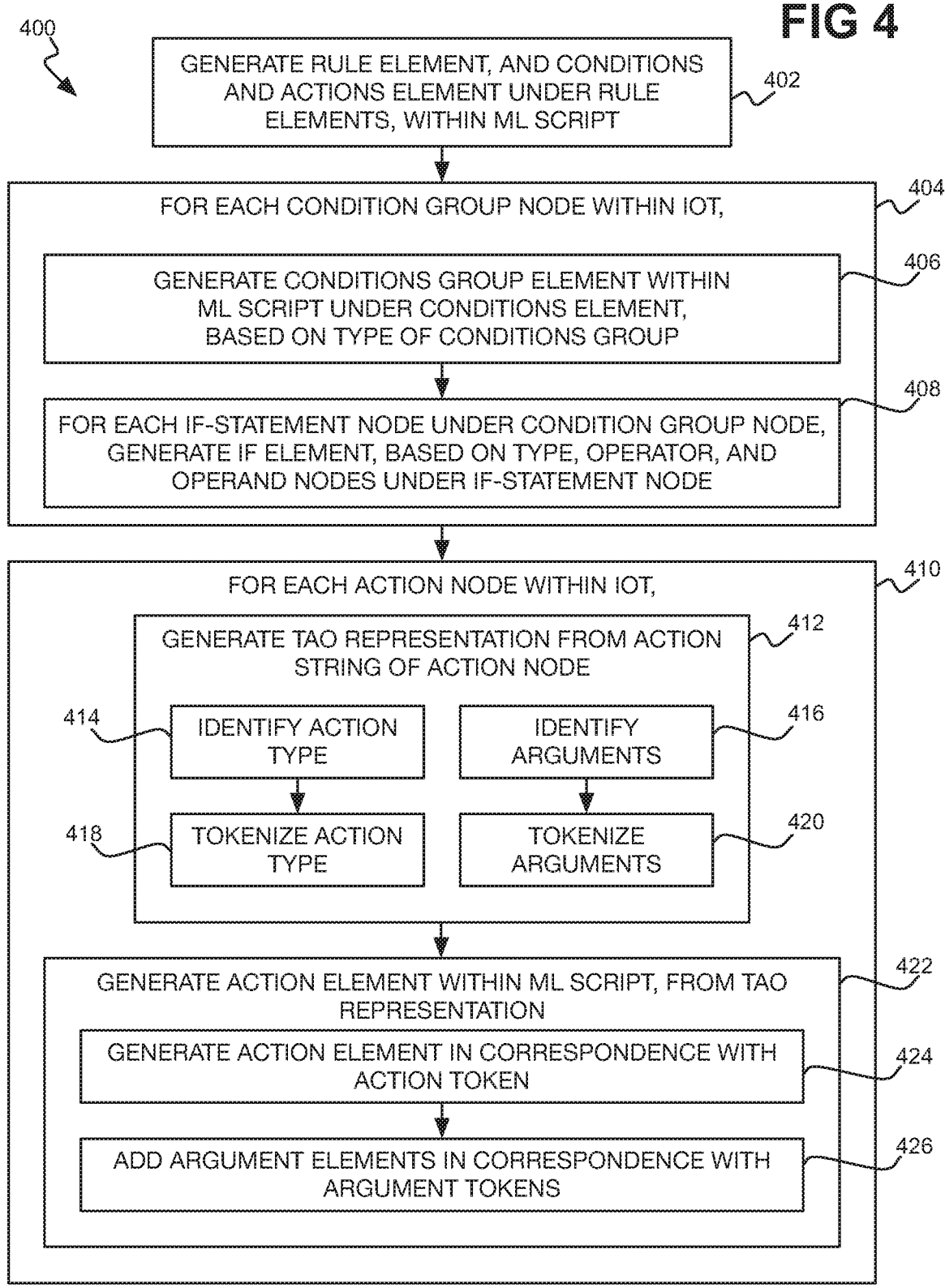
FIG. 4 is a flowchart of an example method for generating an ML script for an IM rule from an IOT.

FIG. 4 shows an example method 400 for generating the ML script from an IOT. The method 400 can be performed to implement part 110 of the method 100. The method 400 hierarchically traverses the IOT, generating the ML script as the nodes of the IOT are visited. The method 400 includes generating a rule element, and both a conditions element and actions element under the rule element (402), to begin the ML script. The method 400 more specifically generates the rule element in correspondence with the rule node of the IOT, and the conditions element and the actions element in respective correspondence with the conditions and actions nodes of the IOT.

For example, the rule element may be generated as the ML tags "<rule>" and "</rule>". The conditions element may be generated as the ML tags "<conditions>" and "</conditions>" and the actions element may be generated as the ML tags "<actions>" and "</actions>". The conditions and actions elements are generated under the rule element in that they are each positioned between the tags "<rule>" and "</rule>" within the ML script.

The method 400 includes performing the following for each condition group node within the IOT (404). A conditions group element is generated within the ML script, under the conditions element (406). The type of the conditions group as specified by the type node under the conditions group node may be persisted in generating the conditions group element. For example, if the conditions group is conjunctive (i.e., the conditions of the group are conjunctively related by logical ANDs), then the conditions group element may be generated as the ML tags "<and>" and "</and>". If the conditions group is disjunctive (i.e., the conditions of the group are disjunctively related by logical ORs), then the conditions group element may be generated as the ML tags "<or>" and "</or>".

For each if-statement node under a condition group node within the IOT, an if element is generated under the corresponding conditions group element, based on the type node, the operator node, and the operand node under the if-statement node in the IOT (408). For example, the type node under an if-statement node may specify the type "if-association." An if element under the conditions group element can thus be generated as the ML tags "<if-association>" and "</if-association>". If the operator node under the if-statement node specifies the operator "equal," then the former tag is changed to "<if-association op="equal">".

More generally, the ML tags corresponding to the type node can be modified according to the operator node. Other examples of operators include greater than, less than, greater than or equal to, and less than or equal to. Operators may be Boolean operators, such as logical AND, OR, XOR (exclusive-or), and so on. Operators may operate with respect to a range, and may be set-type operators, and so on.

If the operand node is not empty, and as an example specifies the operand "{abcd}," then the operand is added between the tags, to result in the if element "<if-association op="equal">{abcd}</if-association>." More generally, the operand of the operand node, if present, is added between the ML tags corresponding to the type node. Any other nodes under the if-statement node, such as miscellaneous nodes, are also processed.

The method 400 includes performing the following for each action node within the IOT (410). First, the method 400 generates a tokenized action object (TAO) representation from the action string of an action node (412). As has been noted, each action node in the IOT specifies an action string describing the action that is to be performed. The TAO representation filters out unnecessary words and phrases from the action string, and normalizes the action string to extract a fixed definition of the action that is to be performed. The TAO representation is a further intermediate representation, from which an action element under the actions element is generated within the ML script.

An action is defined by its action type and corresponding arguments. The object structure of the TAO representation for an action can be:

```
TAO_Representation
{
    ACTION_TOKEN: String
    ARGUMENT_LIST: Array of Strings
}
```

The ACTION_TOKEN refers to a keyword that uniquely identifies the action, and can have the same value as the name of the ML element used to define the action in the ML script. Examples of action tokens include "do-find-matching-object," "do-add-association," and so on. The ARGUMENT_LIST contains an array of strings that describe the arguments imposed on the action, in a format from which the resultant action element can be denoted in the ML script.

In generating the TAO representation from the action string of an action node, the method 400 identifies the action type of the action specified by the action string (414), as well as the arguments specified by the action string (416). That is, method 400 effectively splits the action string into action types and arguments. The grammar structure of an action string in a NL-based rule script (which is then copied to an action node of the TAO) may be denoted as a context-free grammar by which the name of the action and its arguments can be isolated.

For example, the context-free grammar may specify an action string as "ACTION SEPARATOR ARGUMENT_STRING." The SEPARATOR may be NL such as "where," "such that," "whose," and so on. Therefore, the action type is identified as the ACTION part of an action string preceding the SEPARATOR part, and the arguments identified by the ARGUMENT_STRING part of the action succeeding the SEPARATOR part. The individual arguments within the ARGUMENT_STRING part are further individually separated to generate an array or list of the arguments. As an example, the action string of an action node may be, "find matching object whose DN is John and department is IAM." The action string is split into two strings: the action type "find matching object" in part 414, and the arguments "DN is John and department is IAM" in part 416. The term "whose" is ignored.

The method 400 then tokenizes the action type into an action token (i.e., ACTION_TOKEN) (418), and tokenizes the arguments into argument tokens (i.e., ARGUMENT_LIST) (420), to generate the TAO representation. In part 418, a definition reference (DR) table may be referenced to tokenize the action type into an action token. Because there may be numerous phrases to describe an action, the DR table maps such phrases to action tokens, in effect normalizing the phrases.

For example, the phrase "find a matching object" may correspond to the action token "do-find-matching-object" within the TAO representation, and the phrase "add an association" may correspond to the action token "do-add-association" within the TAO representation. A machine learning model can be used to assess the similarity of an encountered phrase of an action type to the phrases of the DR table, with the action token of the most similar phrase in the table selected so long as the similarity is greater than a threshold. For example, the phrase "find a match on" in an action string may be judged as most similar to the phrase "find a matching object" in the table with sufficient similarity that the action token "do-find-matching-object" is selected.

In part 420, the identified arguments are individually separated based on their joining conjunctions to tokenize the arguments into an array or list. The arguments may be separated by conjunctions like "and" and "or." Each argument in turn is defined using the context-free grammar "NAME OPERATION VALUE." In this grammar, the NAME and VALUE fields can be any name, but the OPERATION field is an operation type supported by the schema governing the ML script that is to be generated. A text similarity algorithm may be employed to identify the best operation type to which the term or phrase used in an argument corresponds.

For example, the arguments identified in part 416 may be the ARGUMENT_STRING "DN is John and department is IAM." The argument string is separated into two arguments, ARGUMENT1 to the left of the conjunction "and" and ARGUMENT2 to the right of the conjunction "and." The first argument, ARGUMENT1, is thus "DN is John" and the second argument, ARGUMENT2, is "department is IAM." A text similarity algorithm may correspond the operation "is" in each argument to the valid operation type "equals." Therefore, the tokenized arguments are specified within the TAO representation as ARGUMENT_LIST: {ARGUMENT1: "DN equals John", ARGUMENT2: "department equals IAM"}.

Once the TAO representation has been generated from the action string of an action node, the method 400 generates the action element for the action node under the actions element within the ML script (422), from the TAO representation. The method 400 first generates an action element in correspondence with the action token specified in the TAO representation (424). For example, the action element for the action token "do-find-matching-object" is generated as the ML tags "<do-find-matching-object>" and "</do-find-matching-object>".

The method 400 then adds argument elements to the action element, in correspondence with the argument tokens specified in the TAO representation (426). The argument elements are added within the ML script under the action element—i.e., between the ML tags of the action element. The NAME and OPERATION fields of an argument token may specify a first level of ML tags added as an argument element, and the VALUE field of the argument token may specify one or more second levels of ML tags, nested within the first level of ML tags.

For example, the argument token "DN equals John" includes NAME and OPERATION fields "DN" and "equals," respectively. In the schema governing the ML script, these fields may correspond to the first level of ML tags "<arg-dn>" and </arg-dn>". The VALUE field of this argument token is "John," which may correspond to the second level of ML tags "<arg-value>" and "</arg-value>" nested under the first level of tags, and "<token-text> and </token-text>" nested under "<arg-value>" and "</arg-value>", with the actual value "John" specified between "<token-text> and </token-text>". Therefore, the argument elements added for this argument token are:

```
<arg-dn>
    <arg-value>
        <token-text>John</token-text>
    </arg-value>
</arg-dn>
```

As another example, the argument elements added to the action element for the argument token "department equals IAM" may be:

```
<arg-match-attr name = "department">
    <arg-value>
        <token-text>IAM</token-text>
    </arg-value>
</arg-match-attr>
```

In this example, the NAME and OPERATION fields "department equals" correspond to the first level of ML tags "<arg-match-attr name="department">" and "</arg-match-attr>". The VALUE field "IAM" corresponds to the second level of ML tags "<arg-value>" and "</arg-value>" and the nested tags "<token-text> and </token-text>" with "IAM" specified in-between.

The method 400 thus generates an ML script for an IM rule specified by an NL-based rule script from the IOT that has been generated from the rule script. Generation of the ML script includes generation of conditions-related elements, including the conditions element generated in part 402 and the elements generated in part 404, and generation of actions-related elements, including the rule element generated in part 402 and the elements generated in part 410. Whereas the conditions-related elements generated in part 404 can be generated directly from the IOT, the actions-related elements generated in part 410 are not generated directly from the IOT. Rather, TAO representations are generated from the action strings of the action nodes of the IOT, with corresponding action-related elements then generated from these TAO representations.

Figure 5:
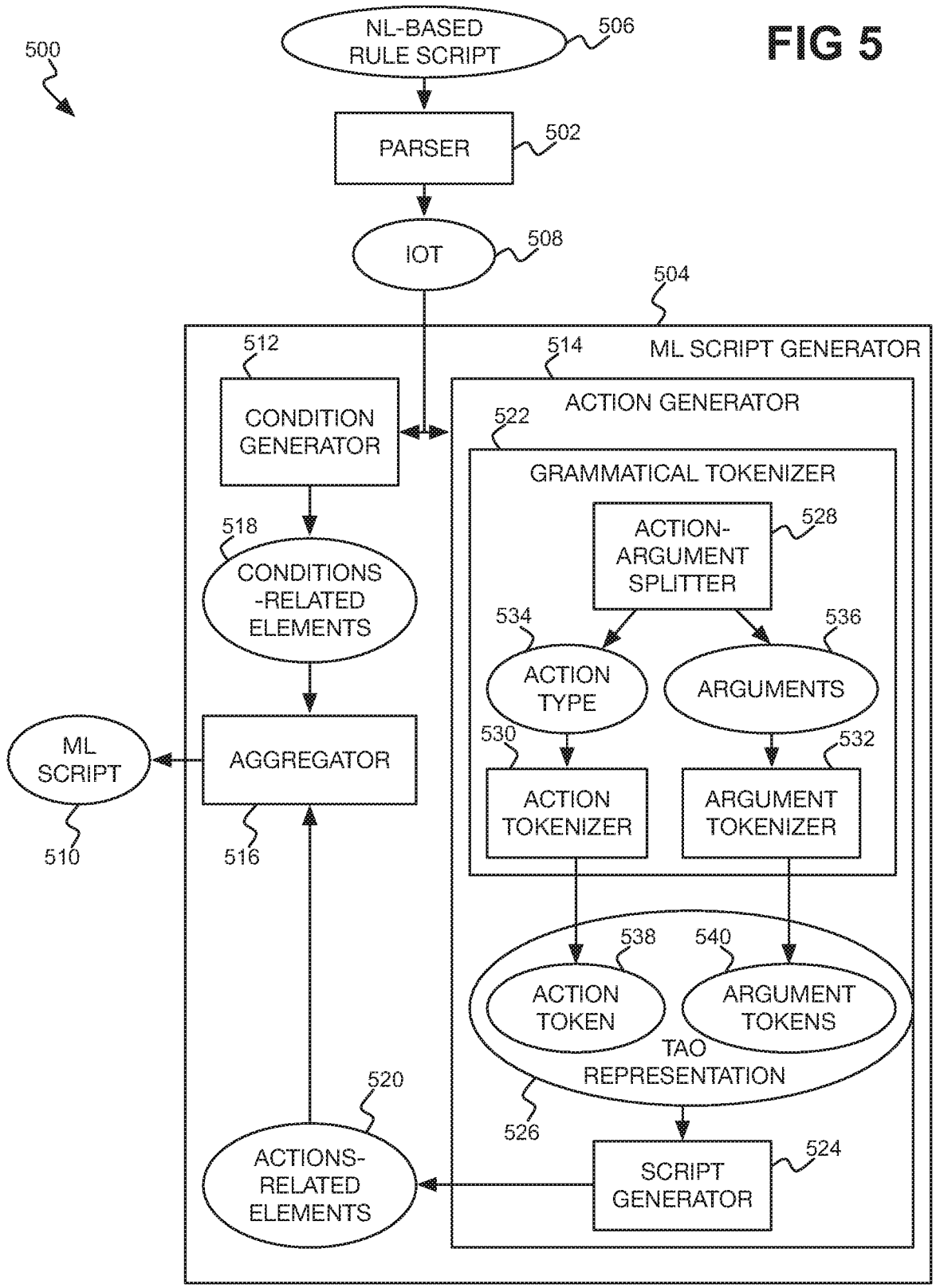
FIG. 5 is a diagram of an example architecture for generating an ML script for an IM rule from a NL-based rule script for the IM rule.

FIG. 5 shows an example architecture 500 in which the methods 200 and 400 of FIGS. 2 and 4 can be performed to generate an ML script for an IM rule from an NL-based rule script in part 102 of the method 100 of FIG. 1. The architecture 500 is an example such architecture of the components, such as software modules, by which the methods that have been described can be implemented, in other words. The architecture 500 includes a parser 502 and an ML script generator 504. The parser 502 and the generator 504 may be implemented as program code stored on a non-transitory computer-readable data storage medium and executed by a processor of a computing device. The parser 502 and the generator 504 can be different software modules, for instance.

The parser 502 generates an IOT 508 from an NL-based rule script 506, such as by performing the method 200 of FIG. 2. The ML script generator 504 generates a ML script 510 from the IOT 508, such as by performing the method 400 of FIG. 4. The generator 504 includes a condition generator 512, an action generator 514, and an aggregator 516, which can be separate software sub-modules of the generator 504.

The condition generator 512 generates the conditions-related elements 518 of the ML script for the conditions nodes of the IOT 508, including the conditions element generated in part 402 and the elements generated in part 404 of FIG. 4. The action generator 514 generates the actions-related elements 520 of the ML script from the IOT 508, including the rule element generated in part 402 and the elements generated in part 410. The aggregator 516 can group, or aggregate, the conditions-related elements 518 and the actions-related elements 520 to form the ML script 510 for the IM rule defined by the NL-based rule script 506.

The action generator 514 includes a grammatical tokenizer 522 and a script generator 524, which can be separate software sub-modules of the generator 514. The grammatical tokenizer 522 generates the TAO representation for each action node of the IOT 508, such as by performing part 412 of FIG. 4. The script generator 524 generates an action ML element for the TAO representation for each action node, such as by performing part 422.

The grammatical tokenizer 522 of the action generator 514 includes an action-argument splitter 528, an action tokenizer 530, and an argument tokenizer 532, which can be separate software modules of the tokenizer 522. The action-argument splitter 528 splits the action string of each action node of the IOT 508 into an action type 534 and arguments 536, such as by performing parts 414 and 416 of FIG. 4. The action tokenizer 530 tokenizes the action type 534 into an action token 538 of the TAO representation 526, such as by performing part 418. The argument tokenizer 532 tokenizes the arguments 536 into argument tokens 540 of the TAO representation 526, such as by performing part 420.

Referring back to FIG. 1, once the ML script has been generated for an IM rule, the ML script can then be used to coordinate user identity and data access across sub-systems of an IM system (104). For instance, a driver that is part of IM software running on a computing device of the IM system can receive event data from a first IM sub-system (112). The event data can pertain to identities of users and/or how updated data access rules of the users, for example, as updated at the first IM sub-system.

The driver applies the IM rule for which the ML script has been generated to the event data (114). The IM rule represented by the ML script generated from an NL-based rule script may be one of a number of different rules that may be applied to the event data. The rules may be grouped into policies. Each ML script may correspond to a different policy, and the driver may apply multiple policies to each rule.

Application of the IM rule can transform the data so that a second IM sub-system is able to understand the data, for instance. Therefore, the driver sends the transformed event data to the second IM sub-system (116), in order to configure the second IM sub-system so that it is updated consistently with the first IM sub-system. In this way, user identity and data access are coordinated between the first and second sub-systems, to ensure that updates made at the first sub-system are reflected at the second sub-system.

Figure 6:
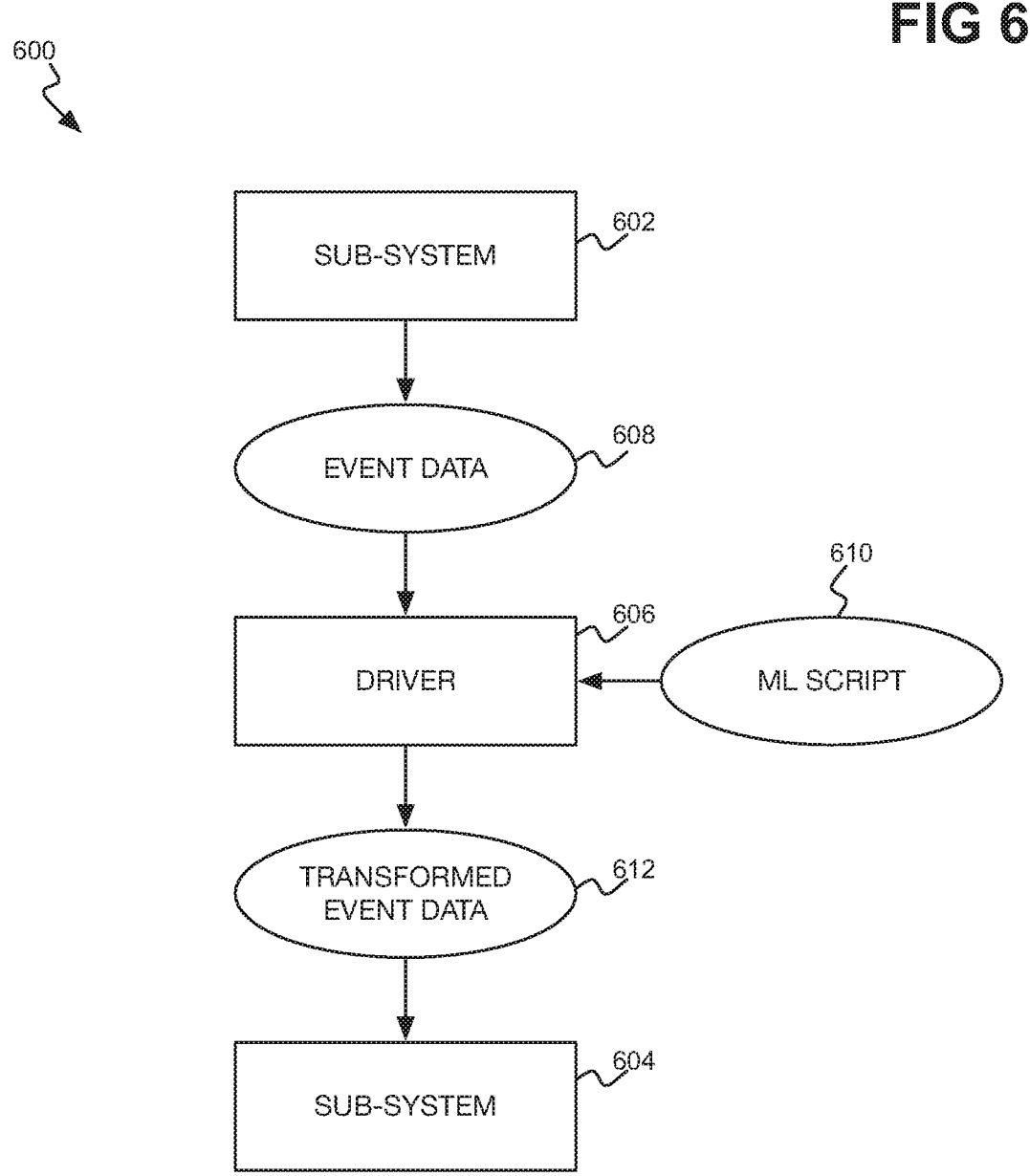
FIG. 6 is a diagram of an example IM system in which an ML script is used to coordinate user identity and data access across IM sub-systems.

FIG. 6 shows an example IM system 600. The example IM system 600 includes sub-systems 602 and 604, and a driver 606. The sub-systems 602 and 604 can each maintain user identities and govern access to different data by users. The sub-system 602 may generate event data 608 that the driver 606 receives, per part 112 of FIG. 1. The driver 606 applies an IM rule represented by an ML script 610, which has been generated from an NL-based rule script, to generate transformed event data 612, per part 114. The driver 606 sends the transformed event data 612 to the sub-system 604 to configure the sub-system 604 to coordinate user identity and data access between the sub-systems 602 and 604, per part 116.

Figure 7:
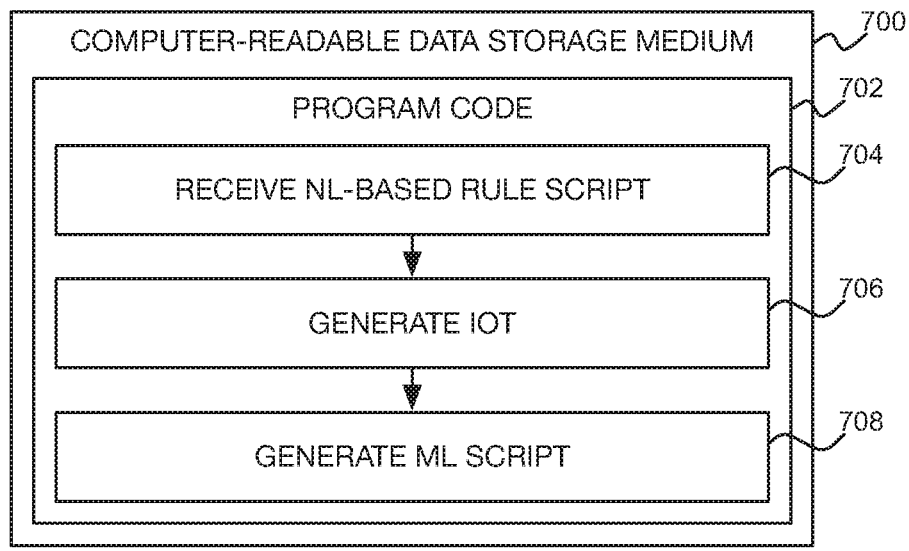
FIG. 7 is a diagram of an example computer-readable data storage medium.

FIG. 7 shows an example non-transitory computer-readable data storage medium 700. The computer-readable data storage medium 700 stores program code 702. The program code 702 is executable by a computing device to perform processing. The processing includes receiving an NL-based rule script defining an IM rule that governs how a driver performs data transformation among sub systems of an IM system to coordinate user identity and data access across the sub systems (704). The processing includes generating an IOT for the IM rule defined within the NL-based rule script by parsing conditions and actions of the IM rule specified in the NL-based rule script (706). The processing includes generating an ML script from the generated IOT of the IM rule (708). The driver uses the ML script when performing the data transformation among the sub-systems of the IM system to coordinate user identity and data access across the sub-systems.

Figure 8:
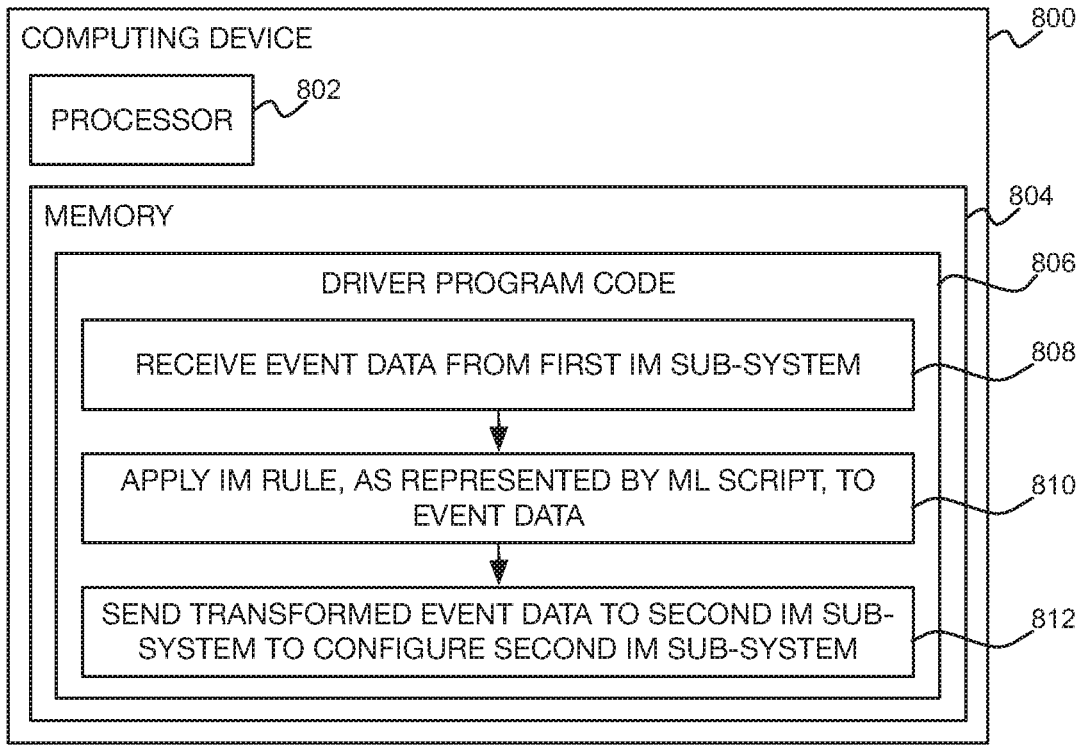
FIG. 8 is a diagram of an example computing device.

FIG. 8 shows an example computing device 800. The computing device 800 includes a processor 802 and memory 804. The computing device 800 can include other hardware components as well. The memory 804 stores program code 804 for a driver of an IM system. The processor 802 executes the program code 804 to coordinate user identity and data access across sub-systems of the IM system by performing the following. The processor 802 receives event data from a first sub-system of the IM system (808), and applies an IM rule represented by an ML script to the event data (810), to generate transformed event data. The ML script is generated from an IOT that is itself generated from an NL-based rule script defining the IM rule, to generate transformed event data. The processor 802 sends the transformed event data to a second sub-system of the IM system to configure the second sub-system (812), in order to coordinate user identity and data access between the first sub-system and the second sub-system.

Techniques have been described herein for generating an ML script for an IM rule that can then be used within an IM system to coordinate user identity and data access. The IM rule is expressed in an NL-based rule script, from which an IOT is generated, with the ML script then generated from the IOT. IM rules can be developed more quickly and with less chance for error, since they are constructed in NL-based rule script instead of by using an unintuitive GUI IDE or directly writing ML scripts.

We claim:

1. A method comprising:
receiving a natural language (NL)-based rule script defining an identity management (IM) rule that governs how a driver performs data transformation among sub-systems of an IM system to coordinate user identity and data access across the sub-systems;
generating an intermediate object tree (IOT) of the IM rule defined within the NL-based rule script by parsing conditions and actions of the IM rule specified in the NL-based rule script, the IOT comprising a plurality of nodes;
generating a markup-language (ML) script from the generated IOT of the IM rule, the driver to use the ML script when performing the data transformation among the sub-systems of the IM system to coordinate user identity and data access across the sub-systems;
receiving event data from a first sub-system of the IM system;
applying the IM rule, as represented by the ML script, to the event data to generate transformed event data; and
sending the transformed event data to a second sub-system of the IM system to configure the second sub-system to coordinate user identity and data access between the first sub-system and the second sub-system.

2. The method of claim 1, wherein the ML script comprises DirXML Script.

3. A non-transitory computer-readable data storage medium storing program code executable by a computing device to perform processing comprising:
receiving a rule script defining an identity management (IM) rule that governs how a driver performs data transformation among sub-systems of an IM system to coordinate user identity and data access across the sub-systems, including how the driver performs transformation of first data received from a first sub-system and governing user identity and data access at the first sub-system to second data sent to a second sub-system and correspondingly governing user identity and data access at the second sub-system;
generating an intermediate object tree (IOT) of the IM rule defined within the rule script by parsing conditions and actions of the IM rule specified in the rule script, the IOT comprising a plurality of nodes; and
generating a markup-language (ML) script from the generated IOT of the IM rule, the driver to use the ML script when performing the data transformation among the sub-systems of the IM system to coordinate user identity and data access across the sub-systems, wherein the driver is to apply the ML script to the first data received from the first sub-system to generate the second data sent to the second sub-system to coordinate user identity and data access between the first sub-system and the second sub-system.

4. The non-transitory computer-readable data storage medium of claim 3, wherein generating the IOT of the IM rule defined with the rule script comprises:
generating a rule node within the IOT, the rule node corresponding to the IM rule defined with the rule script;
generating a conditions node under the rule node within the IOT; and
generating an actions node under the rule node within the IOT.

5. The non-transitory computer-readable data storage medium of claim 4, wherein generating the IOT of the IM rule defined within the rule script further comprises:
for each of one or more condition groups within which the conditions of the IM rule are organized in the rule script:
generating a condition group node under the conditions node within the IOT; and
generating a type node under the condition group node within the IOT, the type node specifying a type of the condition group to which the condition group node corresponds.

6. The non-transitory computer-readable data storage medium of claim 5, wherein generating the IOT of the IM rule defined within the rule script further comprises, for each condition group:
for each condition of the IM rule specified in the rule script as part of the condition group:
generating a condition node under the condition group node corresponding to the condition group within the IOT;
generating a type node under the condition node within the IOT, the type node specifying a type of the condition;
generating an operator node under the condition node within the IOT, the operator node specifying an operator of the condition; and
generating an operand node under the condition node within the IOT, the operand node specifying an operand of the condition.

7. The non-transitory computer-readable data storage medium of claim 4, wherein generating the IOT of the IM rule defined within the rule script further comprises:
for each action of the IM rule specified in the rule script, generating an action node including an action string for the action.

8. The non-transitory computer-readable data storage medium of claim 7, wherein, for each action of the IM rule specified in the rule script, generating the action node comprises copying the action string from the rule script into the action node.

9. The non-transitory computer-readable data storage medium of claim 7, wherein, for each action of the IM rule specified in the rule script, the action node is an only node within the IOT for the action.

10. The non-transitory computer-readable data storage medium of claim 7, wherein the actions comprise a do-if action,
and wherein the action node generated for the do-if action is a do-if action node.

11. The non-transitory computer-readable data storage medium of claim 6, wherein generating the ML script from the generated IOT of the IM rule comprises:
generating a rule element within the ML script corresponding to the rule node within the IOT;

generating a conditions element under the rule element within the ML script, the conditions element corresponding to the conditions node within the IOT; and for each condition group node within the IOT, generating a conditions group element within the ML script, the conditions group element having a type corresponding to the type node under the condition group node within the IOT.

12. The non-transitory computer-readable data storage medium of claim 11, wherein generating the ML script from the generated IOT of the IM rule further comprises, for each condition group node within the IOT:

for each condition node under the condition group node, generating an if element within the ML script, based on the type node, the operator node, and the operand node under the condition node within the IOT.

13. The non-transitory computer-readable data storage medium of claim 7, wherein generating the ML script from the generated IOT of the IM rule comprises:

generating a rule element within the ML script corresponding to the rule node within the IOT;

generating an actions element under the rule element within the ML script, the actions element corresponding to the actions node within the IOT; and for each action node within the IOT:

generating a tokenized action object (TAO) representation from the action string of the action node; and generating an action element within the ML script from the TAO representation.

14. The non-transitory computer-readable data storage medium of claim 13, wherein, for each action node within the IOT, generating the TAO representation comprises:

identifying an action type from the action string of the action node; and tokenizing the action type into an action token representing the action to which the action node corresponds.

15. The non-transitory computer-readable data storage medium of claim 14, wherein, for each action node within the IOT, generating the TAO representation further comprises:

identifying a plurality of arguments from the action string of the action node; and tokenizing the arguments into a plurality of argument tokens representing arguments of the action to which the action node corresponds.

16. The non-transitory computer-readable data storage medium of claim 15, wherein, for each action node within the IOT, generating the action element within the ML script from the TAO representation comprises:

generating the action element in correspondence with the action token; and adding argument elements to the action element in correspondence with the argument tokens.

17. The non-transitory computer-readable data storage medium of claim 3, wherein the ML script comprises DirXML Script.

18. A computing device comprising:

a processor; and a memory storing program code for a driver of an identity management (IM) system, the processor to execute the program code to coordinate user identity and data access across a plurality of sub-systems of the IM system by:

receiving event data from a first sub-system of the IM system;

applying, to the event data, an IM rule represented by a markup-language (ML) script generated from an intermediate object tree (IOT) generated from a natural language (NL)-based rule script defining the IM rule, to generate transformed event data; and sending the transformed event data to a second sub-system of the IM system to configure the second sub-system to coordinate user identity and data access between the first sub-system and the second sub-system.

19. The computing device of claim 18, wherein the IOT is generated from the NL-based rule script by parsing conditions and actions of the IM rule to generate a plurality of nodes of the IOT, wherein the ML script is generated from the IOT by generating conditions-related elements within the ML script from condition-related nodes of the IOT and by generating actions-related elements within the ML script from tokenized action object (TAO) representations generated from action strings of action-related nodes of the IOT.

20. The computing device of claim 18, wherein the ML script comprises DirXML Script.

* * * * *